Jan. 13, 1970     F. HOCK ET AL     3,489,908
INCREMENTAL TRANSDUCER COMPRISING CODED TRACK GRATINGS
TRAVERSED BY LIGHT RAYS A PLURALITY OF TIMES
AND USING POLARIZED BEAM SPLITTERS

Filed July 14, 1967     2 Sheets-Sheet 1

INVENTORS
FROMUND HOCK
KNUT HEITMANN
BY Krafft & Wells
ATTORNEYS

Jan. 13, 1970  F. HOCK ET AL  3,489,908
INCREMENTAL TRANSDUCER COMPRISING CODED TRACK GRATINGS
TRAVERSED BY LIGHT RAYS A PLURALITY OF TIMES
AND USING POLARIZED BEAM SPLITTERS
Filed July 14, 1967  2 Sheets-Sheet 2

INVENTORS
FROMUND HOCK
KNUT HEITMANN
BY Krafft & Wells
ATTORNEYS 3,489,908
INCREMENTAL TRANSDUCER COMPRISING CODED TRACK GRATINGS TRAVERSED BY LIGHT RAYS A PLURALITY OF TIMES AND USING POLARIZED BEAM SPLITTERS
Fromund Hock and Knut Heitmann, Wetzlar, Germany, assignors to Ernst Leitz G.m.b.H., Wetzlar, Germany
Filed July 14, 1967, Ser. No. 653,574
Claims priority, application Germany, July 16, 1966, L 54,090
Int. Cl. H01j 39/12, 3/14
U.S. Cl. 250—237          5 Claims

ABSTRACT OF THE DISCLOSURE

In a photoelectric incremental transducer comprising a grating of which an image is projected onto a second grating or onto itself and further comprising amongst other elements a light source, a beam splitter, and at least two photoelectric receivers for generating position-defining signals a device is disclosed for generating additional signals which may be applied as control signals to various usages, e.g. for controlling the working accuracy of a counter mechanism connected to said incremental transducer.

Said device comprises an index grating disposed behind said beam splitter in the direction of the light flux and having transparent and non-transparent lines thereon. Two additional photoelectric receivers are employed behind said index grating, which receivers are adapted to scan said index grating, thereby generating additional signals.

Further, gratings are disclosed which are provided with code tracks extending in parallel to the lines on the grating. Of said code tracks no images are projected onto the second grating or onto themselves. However, images of said code tracks are projected onto corresponding code tracks on the index grating. From the photoelectric receivers scanning said index grating code signals are then obtained which may be used for a coded defining of a position.

CROSS REFERENCE OF RELATED APPLICATIONS

Priority is claimed under 35 U.S.C. 119 for the invention as defined in claim 1 from application L 54,090 IXb/42d, filed July 16, 1966, in the Patent Office of the Federal Republic of Germany. No foreign priority is claimed for the invention defined in claims 2 through 5.

BACKGROUND OF THE INVENTION

Field of the invention

The invention relates to a measuring apparatus for determining the length or the angle of an object. More specifically, the invention relates to a measuring device which comprises a light source, an optical system, a grating which is displaceable relative to said optical system, and photoelectric receivers, by the displacement of said grating—which may be a linear or a rotary motion—the light flux is caused to vary periodically which variations are converted to photoelectric current fluctuations and may be used in electronic counting techniques or analogus evaluations.

Description of the prior art

Measuring devices of the above described type are known to those skilled in this particular art as photoelectric incremental transducers. They may be used for measuring the extent of the motion of the grating relative to an object, thereby defining the length of said object. According to the same principle an angle may be measured or the angular position of an object may be determined by a device commonly called incremental angle transducer, wherein said grating is a disc having radially extending lines and wherein the motion of said grating is a rotatory one.

It is an object of the present invention to provide a means adapted to generate additional signals which may be used for controlling purposes of various kinds.

It is further object of the invention to provide means by which code signals may be obtained for coded defining of a position.

SUMMARY OF THE INVENTION

Photoelectric incremental transducers as known in the art comprise a displaceable grating, an image of a portion of said grating is projected onto itself or onto a second grating which is rigidly connected to the first one. The elements conventionally used for this imaging purpose comprise a light source, a first objective, a first reflecting element, a beam doubling and polarizing element, a second and non-po'arizing reflecting element and a second objective. Behind the grating in the direction of the light flux a polarizing beam splitter is arranged by which the two polarized light beams are transmitted or reflected respectively to at least two photoelectric receivers. Said receivers being adapted to generate position-defining signals. According to the invention a non-polarizing beam splitter is used for the above mentioned second and non-polarizing reflecting element which transmits part of the impinging light to an additional stationarily mounted index grating. A po'arizing beam splitter is mounted behind said additional index grating, also being adapted to transmit or reflect respectively said two polarized beams onto photoelectric receivers. By the latter additional signals are generated which may be made use of in the aforedescribed manner.

Since the additional index grating is stationarily mounted, the frequency of the additionally generated signals will be only half of the frequency of the position-defining signals.

Further, by specially designing the employed gratings it is also possible to obtain signals having the frequency $f$, $2f$ and $4f$, wherein $4f$ stands for the frequency of the position-defining signals.

DESCRIPTION OF THE PREFERRED EMBODIMENTS

Figure 1:
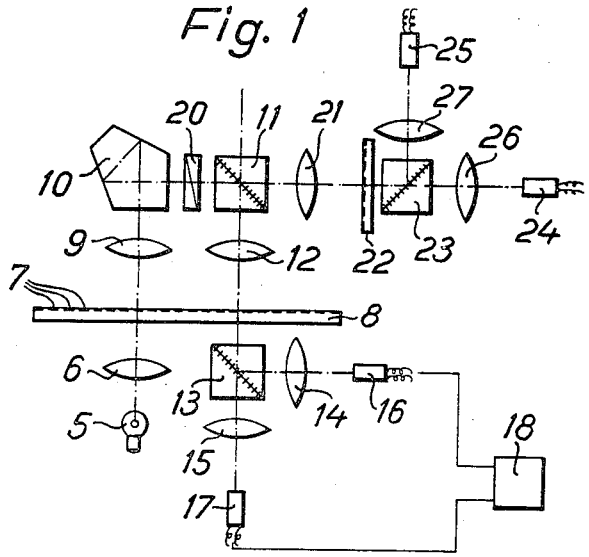
FIGURE 1 shows schematically a photoelectric incremental transducer of known design and being provided with an additional grating according to the invention.

In FIGURE 1 a light source 5 is depicted which illuminates by means of a condenser 6 a portion of a transparent linear grating 8. The light source 5 is preferably provided with an incandescent filament forming a linear emitting surface. Grating 8 is provided with non-transparent lines 7 thereon to which the emitting surface of source 5 extends in parallel and between which lines 7 the light rays emitted by source 5 pass to an objective 9, a pentaprism 10, and to a Wollaston-prism 20. As is well known to those skilled in the art a Wollaston-prism doubles the impinging light beam, both light beams then continuing in their path relatively inclined to each other by an angle which depends on the properties of the Wollaston-prism. Both beams then also being polarized in directions normal to each other.

The two beams impinge on a non-polarizing beam-splitting cube 11. A portion of said beams is reflected to an objective 12 and further to the grating 8. In this way two images of the illuminated grating portions—slightly displaced relative to each other—are projected back onto the grating, the imaging ratio of the employed objectives 9 and 12 being, of course, exactly 1:1.

Both light beams transmit the grating 8 in the space between the lines 7 and travel to a polarizing beam splitter 13. The latter being adapted to let pass those light beams which are polarized in one direction through a lens 15 to a first photoelectric receiver 17 and to reflect the light beams which are polarized in the other direction through a lens 14 to a second photoelectric receiver 16. The signals generated by said photoelectric receivers 16, 17 constitute the position-defining signals and are conducted to an evaluation device 18.

The elements described hereinbefore are known in the incremental transducer technique and, therefore, belong to the prior art, except beam-splitting cube 11 which previously used to be a simple non-polarizing reflecting element.

According to the invention this element has been replaced by said beam-splitting cube 11 through which a portion of each polarized light beam originating from the Wollaston-prism 20 travels to a lens 21 and onto an index grating 22 which is stationarily mounted in the path of said beams. Behind grating 22 a second polarizing beam-splitting cube 23 is disposed which corresponds in design and effect to the first mentioned cube 13. It separates the two polarized beams according to their direction of polarization, allowing one beam to pass on through lens 26 to the photoelectric receiver 24 and reflecting the other beam through lens 27 to photoelectric receiver 25.

In this manner a device is provided by which two signals are obtained in addition to the position-defining signals generated by the receivers 16 and 17. However, since grating 22 is stationarily mounted, in contradistinction to this part of grating 8 onto which the illuminated portion of grating 8 is projected, the frequency of the additionally generated signals will be only half the frequency of the position-defining signals.

The additionally generated signals may be used for various purposes. For example, an auxiliary counter may be operated by said signals. The reading of this auxiliary counter may be compared with the reading of the counter storing the result of the measurement. Thereby it will be possible to detect mistakes in the result of the measurement immediately and to signal and/or automatically correct said mistakes.

Figure 2:
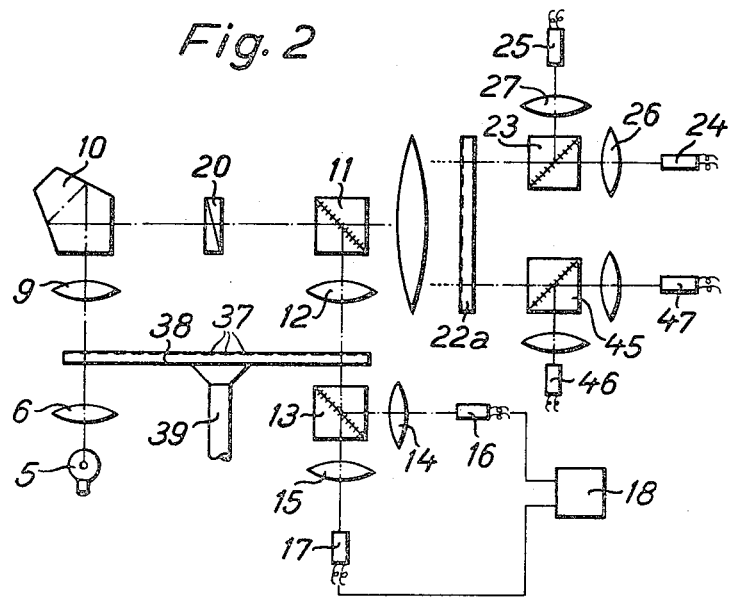
FIGURE 2 shows schematically a photoelectric incremental angle transducer having a radial grating and an additional grating and further being provided with code tracks extending in parallel to the lines of the gratings.

A second embodiment of the invention is depicted by way of example in FIGURE 2. The grating 38 in said embodiment is a circular disc having radially extending lines thereon. Grating 38 is rotatable about axis 39. The device, therefore, is an incremental angle transducer, wherein, however, the elements 5, 6, 9, 10, 18 and 20 corresponds to the like numbered elements as described above with reference to the embodiment according to FIGURE 1.

Figure 2A:
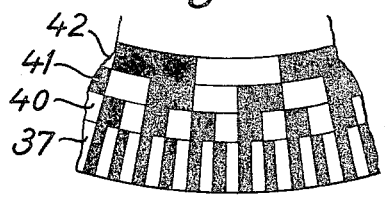
FIGURE 2a is an enlarged portion of the grating used in the embodiment depicted in FIGURE 2.

Besides, with the lines 37 the grating 38 is in addition provided with the tracks 40, 41, 42. One track may constitute, for example, a binary code, other tracks may be used to define other types of codes (FIGURE 2a). The index grating 22a is provided with a corresponding arrangement of grating lines and tracks. Behind the index grating in the direction of the light flux a polarizing beam splitting cube 23 is arranged upon which those light beams impinge which have transmitted the lines 37 of the grating 38. Cube 23 either transmits or reflects respectively the light beams according to the direction in which they are polarized through lenses 26 or 27 to the additional signal-generating photoelectric receivers 24, 25.

Figure 2B:
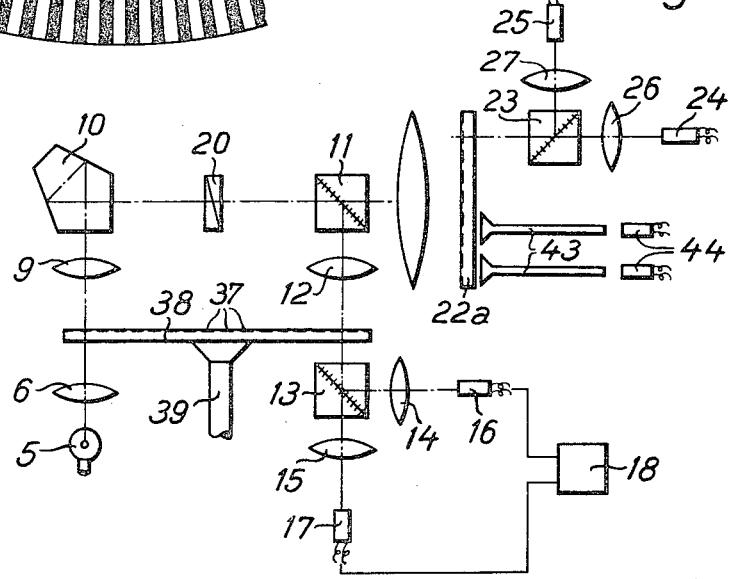
FIGURE 2b shows a modification of the photoelectric incremental transducer according to FIGURE 2.

For scanning the tracks 40, 41, 42 either also a polarizing beam splitting cube 45 may be employed with photoelectric receivers 46 and 47 (FIGURE 2), or optical fibers 43 may be used for conducting the light onto receivers 44 (FIGURE 2b).

Since the frequency of the signals generated by the receivers 24, 25 is only half of the frequency of the signals obtained from receivers 16 and 17 they are suitable for coded representation of the measurement values. From the tracks 40, 41, 42 additional code signals may be obtained. Thus, according to the invention from the tracks of the grating lines the same number of informations may be obtained as was previously possible only by using two code tracks.

It will be possible, of course, to employ a grating having additional code tracks as described with reference to FIGURE 2 in a linear measurement device according to FIGURE 1. Also, no difficulties will be encountered in assembling the index gratings from two single parts one of which being provided with the grating lines, the other one with the code tracks.

Figure 3:
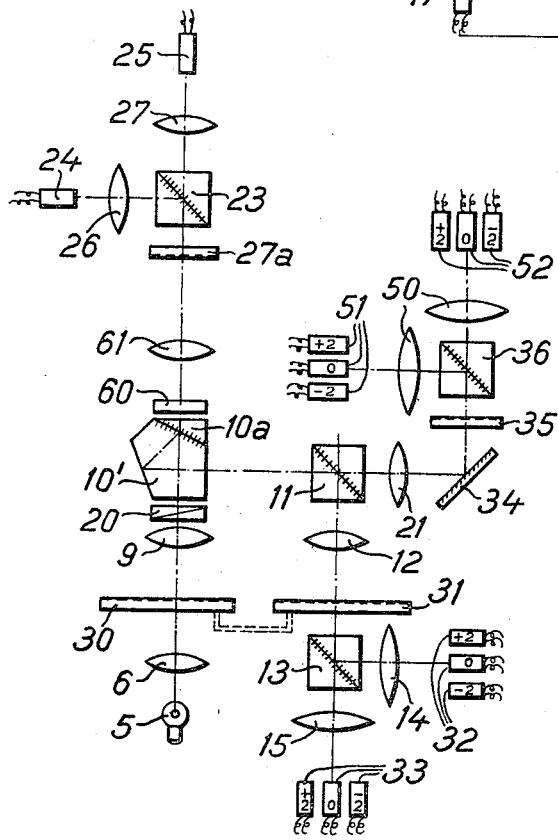
FIGURE 3 shows schematically a photoelectric incremental transducer in which a first phase grating is imaged on a second phase grating, and further two additional gratings are employed one of which also being a phase grating, the other one being an amplitude grating.

In FIGURE 3 an embodiment of the invention is illustrated wherein the light source 5 through condenser 6 illuminates a portion of a phase grating 30. By means of the objective 9, the beam doubling and polarizing element 20, the pentaprism 10', beam splitting cube 11, and objective 12 two images of this portion are projected onto a second phase grating 31 which is rigidly connected to the first mentioned phase grating 30. The scale ratio of object and images being 1:1.

A polarizing beam splitting cube 13 is disposed behind phase grating 31, said cube being adapted to separate the counter-phase modulated images according to their diffraction order and to conduct said images through lenses 14, 15 to photoelectric receivers 32, 33.

Behind beam splitting cube 11 a reflecting prism 34 is arranged with the lens 21 inserted between said elements. The reflecting prism 34 is adapted to reflect a portion of the impinging beams to a phase grating 35. Photoelectric receivers 51, 52 are attached to said grating 35 by means of a polarizing beam splitting cube 36 and lenses 50.

To one surface of pentaprism 10' a complementary prism 10a is cemented, thereby turning said pentaprism surface into a beam splitting surface. A portion of the light impinging on pentaprism 10' transmits said beam splitting surface and passes through a phase retarding plate 60 disposed behind complementary prism 10a.

Plate 60 effects the various diffraction orders of the light in the same way as is well known from phase contrast microscopy. An objective 61 is provided behind plate 60. Said objective projects two amplitude images of the phase grating 30 onto an amplitude grating 27a having a grating constant equal to the grating constant of the projected grating images, which grating 27a is disposed behind objective 61 in the direction of the travelling light.

Further, a polarizing beam splitting cube 23 is employed which transmits or reflects respectively the light beams through lenses 26, 27 to two photoelectric receivers 24, 25. The frequencies of the signals generated by the photoelectric receivers 24, 25, by the receivers 51, 52, and by the receivers 32, 33 are of the ratio 1:2:4.

It is thus readily discernible that by employing the means according to the invention from the motion of a single grating a plurality of signals may be produced the frequencies of which are of a fixed ratio and which may be used for various purposes as indicated hereinbefore.

What is claimed is:

1. A photoelectric incremental transducer comprising
a partially transparent grating (8, 30, 38) having equidistantly positioned non-transparent lines (7, 37) thereon, said grating being displaceable;
a light source (5) adapted to illuminate part of said grating;
optical means (9, 10, 12) adapted to project an image of said illuminated part of said grating onto a second part of said grating, said optical means further including an optical element (20) disposed on the opposite side of the grating from where said light source is arranged, said optical element being adapted to double the light beams passing through said grating thereby polarizing each of said beams in directions normal to each other;
a non-polarizing beam splitting element (11) in the path of said light rays and being adapted to project said doubled light beams back onto said grating (8, 30, 38);
a polarizing beam splitting element (13) being disposed behind said grating (8, 30, 38) in the direction of the light flux;
two photoelectric receivers (16, 17, 32, 33) to which said beam splitting element (13) transmits or reflects respectively one of said double beams, and being adapted to generate two position-defining photoelectric current signals;
a second and stationarily mounted grating (22, 22a, 22b) being disposed behind said beam splitting element (11) in the direction of the light flux;
a second polarizing beam splitting element (23) being disposed behind said second grating (22);
photoelectric receivers (24, 25) onto which said second polarizing beam splitting element (23) transmits or reflects respectively this portion of the light beams which has passed through said second grating (22, 22a, 22b), said photoelectric receivers (24, 25) generating signals of half the frequency of the signals generated by said first mentioned photoelectric receivers (16, 17).

2. A photoelectric incremental transducer according to claim 1 and further comprising
code tracks (40, 41, 42) on the grating (38) extending in parallel to the lines of said grating;
code tracks on the second grating (22a) extending in parallel to the lines of said grating and corresponding in graduation to the code tracks on the first mentioned grating (38);
optical means being disposed behind said grating (22a), said means being adapted to conduct the light beams passing through said code tracks to photoelectric receivers.

3. A photoelectric incremental transducer according to claim 2, wherein said optical means comprise
a polarizing beam splitting element (45) for transmitting or reflecting respectively said light beams to two photoelectric receivers (46, 47).

4. A photoelectric incremental transducer according to claim 2, wherein said optical means comprise
optical fiber elements (43) corresponding in number to the number of code tracks on the grating, said fiber elements being adapted to conduct said light beams to photoelectric receivers (44).

5. A photoelectric incremental transducer comprising
a partially transparent phase grating (30), said grating being displaceable;
a light source (5) adapted to illuminate part of said grating, said light source being provided with an incandescent filament having a linearly extending emitting surface;
optical means (9, 10', 12) adapted to project two images of said illuminated part of said phase grating (30) onto a second phase grating (31) rigidly connected to said first phase grating (30), said optical means further including an optical element (20) disposed on the opposite side of the grating from where said light source is arranged, said optical element being adapted to double the light beam passing through said grating, thereby polarizing each of said beams in directions normal to each other;
a non-polarizing beam splitting element (11) in the path of said light rays and being adapted to project said doubled light beams onto said phase grating (31);
a polarizing beam splitting element (13) being disposed behind said second phase grating (31) in the direction of the light flux;
two photoelectric receivers (16, 17, 32, 33) to which said beam splitting element (13) transmits or reflects respectively one of said double beams, and being adapted to generate two position-defining photoelectric current signals;
a third phase grating (35) being disposed behind said non-polarizing beam splitting element (11) in the travel direction of one of the two light portions emerging from said element (11);
a second polarizing beam splitting element (36) being disposed behind said phase grating (35);
photoelectric receivers (51, 52) onto which said polarizing beam splitting element (36) transmits or reflects respecitvely the light beams which have passed through said phase grating (35);
a complementary prism (10a) being cemented to the pentaprism (10');
a phase retarding plate (60) in the path of the light rays passing through said prism (10a);
an objective (61) adapted to project two amplitude images of said phase grating (30) onto an amplitude grating (22b) disposed behind said objective (61);
a third polarizing beam splitting element (23) being disposed behind said grating (22b);
photoelectric receivers (24, 25) onto which said third polarizing beam splitting element (23) transmits or reflects respectively this portion of the light beams which has passed through said amplitude grating (22b).

References Cited

UNITED STATES PATENTS

| | | | |
|---|---|---|---|
| 2,849,912 | 9/1958 | Plesse et al. | 250—220 X |
| 2,986,066 | 5/1961 | Rouy | 356—116 |
| 2,998,746 | 9/1961 | Gievers | 250—225 X |
| 3,198,061 | 8/1965 | Hock | 250—237 |
| 3,421,011 | 1/1969 | Hock | 250—231 |

JAMES W. LAWRENCE, Primary Examiner

V. LAFRANCHI, Assistant Examiner

U.S. Cl. X.R.

250—220, 225; 350—152; 356—114